March 22, 1938.  H. A. RICHARD  2,111,991

SYSTEM FOR HEATING BY HOT WATER CIRCULATION

Filed Nov. 17, 1936

INVENTOR
Henri A. Richard
By Summers & Young
ATTORNEYS.

Patented Mar. 22, 1938

2,111,991

UNITED STATES PATENT OFFICE 2,111,991

SYSTEM FOR HEATING BY HOT WATER CIRCULATION

Henri André Richard, Troyes, France

Application November 17, 1936, Serial No. 111,324
In Great Britain January 15, 1936

2 Claims. (Cl. 237—56)

This invention relates to improvements in and connected with hot water and like installations and particularly such as are adapted for central heating purposes.

In the ordinary way, the expansion chambers of hot water installations have two functions:—

(1) They permit the free expansion of water by absorbing the excess produced by expansion and they restore that water to the tubes if the temperature of the water in movement diminishes.

(2) They permit of evacuating to the exterior of the apparatus the air contained in the tubes and the vapours released by the hot water.

In the ordinary system of circulation by thermosiphon, the two functions are accomplished by the expansion chamber connected to the apparatus by a single tube.

The object of the present invention is to separate these two functions. As a result it is possible to use water at a higher temperature and even to ebullition. There is then obtained a greater radiation of heat from the radiators and an enhanced speed of circulation because of the lightening of the ascending hot column of water. This permits of employing tubes of smaller section in the heaters and of obtaining increased efficiency.

For fulfilling the first function, it is not necessary to connect the expansion chamber to a high point of the hot water distribution, as in ordinary systems. The pressure produced by expansion is communicated to the totality of water in circulation. The expansion chamber can therefore be connected to cold water tubes. By this means, the present invention avoids loss of heat in the expansion chamber. Expansion thus causes entry of cold water into the chamber, instead of hot water.

For fulfilling the second function, there must be a connection with a high point on the tube system, and this will be a hot water point. This is necessary in order to effect evacuation of air dissolved in the water, or of air contained in the tubes at the commencement of filling the apparatus with water.

The invention provides for connecting two tubes to the heating apparatus for the performance of the functions above referred to.

One tube is connected to a cold water tube for the expansion and a second tube is connected to a high point on the hot water tubes for the evacuation of air. A device now to be described is mounted upon the second tube. This device is in the nature of a cock or valve adapted so that when closed it affords a limited or calibrated escape or leakage for the air and vapours released during working but which, when opened, affords a free escape for a body of air such as that which is displaced when filling the apparatus. During working, air and vapours are disengaged only slowly, so that a limited escape is sufficient. Air is entrained by the current of hot water until it reaches the high point of the tubes and, being much lighter than the water, it has a tendency to remain there. If the relief tube were not present, the accumulated air would obstruct the tubes and partially or completely arrest the circulation.

In order to enable this invention to be readily understood reference is made to the accompanying drawing wherein:—

Figure 1:
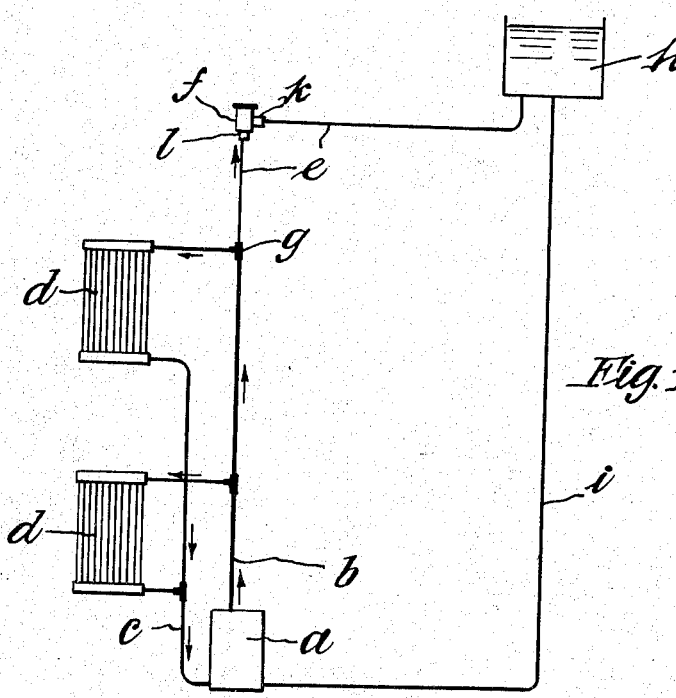
Figure 1 is a diagram of a heating installation according to the present invention.

The heating installation in Figure 1 comprises a boiler or heater $a$ connected by rising and falling flow pipes $b$ and $c$ respectively to radiators $d$ which are connected in parallel with one another. Thus the boiler $a$ flow pipes $b$ $c$ and radiators $d$ form a closed circuit the enclosed fluid circulating by the thermal thermosiphonic system.

A relief tube $e$ upon which is mounted a valve device $f$, which will be more fully described later, is connected to the highest point such as $g$ of this said closed circuit. The provision of this valve device $f$, which affords a limited escape or leakage for air and vapours released from the fluid during working, enables the expansion tank $h$ to be connected, by the pipe $i$ to a low point of the circuit such as the bottom of the boiler or heater $a$. The advantages consequent upon this connection have already been explained.

Figure 2:
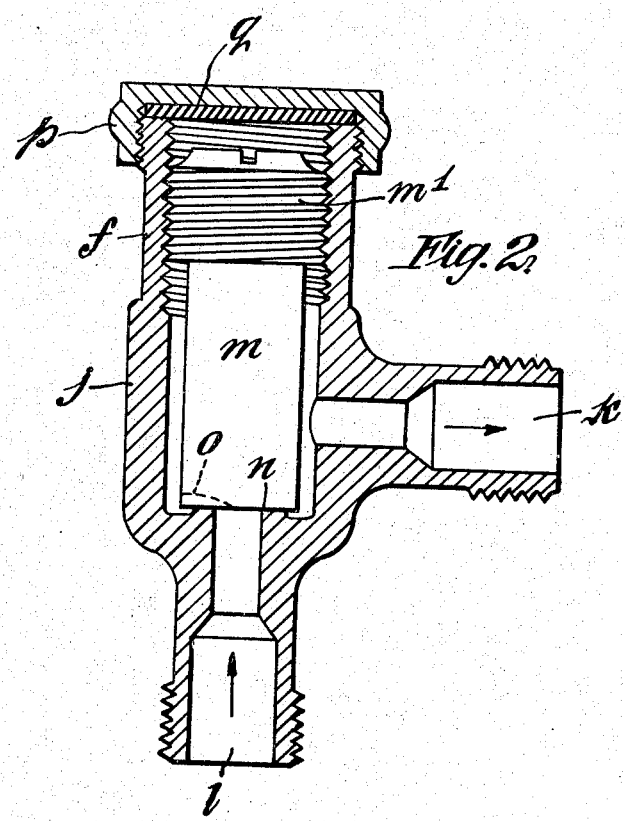
Figure 2 is a central vertical section to a larger scale of a valve device seen in Figure 1.

According to one construction the valve device $f$, Figure 2, in question comprises a cylindrical chamber $j$ having a lateral outlet connection $k$ in its vertical cylindrical wall and a central inlet connection $l$ in its bottom end wall, such inlet connection being adapted for connection with the relief tube $e$. The upper portion of this chamber is screw threaded to receive the screw threaded head of a cylindrical body $m$ which is of smaller diameter than the internal diameter of the cylindrical chamber. The head $m^1$ is formed with means such as a screw driver slot for enabling it to be screwed up or down. When this body $m$ is screwed down, its lower end comes upon a seating $n$ surrounding the inlet $l$ and closes the latter excepting for a limited or calibrated escape to be described. When the body m is screwed upwards, its lower end unseats and affords free communication between the said inlet l and the lateral outlet k. The top of the cylindrical chamber j is preferably closed, as for example by a screw-on cap p having a packing disc q to make the closure tight. Thus, the cylindrical body m can be adjusted up or down only after removing this cap.

Figure 3:
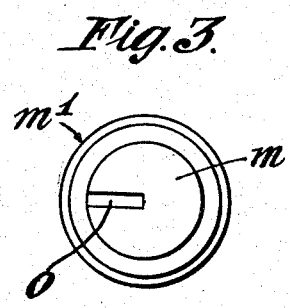
Figure 3 is an end elevation of the cylindrical body of Figure 2.

The limited or calibrated escape aforesaid is, for example, provided by forming a radial saw cut o (see also Figure 3) in the bottom of the cylindrical body m. This saw cut may have a depth of say 1 millimetre at the periphery of the body m and may fade away to nothing at the centre, and it may have a width of about one millimetre. Only a small end portion of this saw cut o may be uncovered by the inlet l when the cylindrical body is seated. The limited escape, however, may be provided by other suitable means.

If the cylindrical body m or its seating did not possess the limited escape means, the regulation of the dimensions of an escape passage by raising or lowering the body m would be very difficult, for the movement of fluid in the escape tube e must be very small in order to obtain reliable movement of hot or boiling fluid to the radiators. The said passage, obviously, must not be so large as to establish any sort of effectual short circuit, whereby the relief device would rob the radiators of heat.

The limited passage above referred to may become obstructed by deposits after long use. In that event, the cylindrical body m may be unscrewed without interrupting the heating, thereby permitting a high speed movement of fluid which will clear the said passage.

The device f constitutes a sort of cock which cannot be completely closed. It is evident that other analogous cock devices could be used without departing from the invention. The device, as described, however, has the advantage that when the cap p is screwed on, the user is not liable to disturb the setting of the cylindrical body m when cleaning or attending to the apparatus.

I claim:—

1. A hot water central heating installation comprising in combination a circulatory system of water conduits having a boiler or heater, and a radiator connected therein, an expansion tank, a conduit connecting the expansion tank with a low and cold point of the circulating system, a valve device to afford a free escape of a body of air such as that which is displaced when filling the circuit installation when open having a small passage formed therein to afford a limited escape for fluid when closed, the said valve being connected to a high and hot point of the circulatory system, and a relief conduit connected between the escape of said valve and the bottom of the expansion tank for discharging air from the high point of the system to beneath the water level in the expansion chamber.

2. A hot water central heating installation comprising in combination a circulatory system of water conduits having a boiler or heater, and a radiator connected therein, an expansion chamber, a conduit connecting said chamber to a low and cold point of the circulatory system, a valve device connected in said system at a high and hot point of the system and manually adjustable to an open position to afford free escape of fluid from the system, said valve having a restricted passage when closed affording a limited escape for air disengaging itself from the water from the high point of the system, and a relief tube connecting the valve to the bottom of the expansion chamber for discharging fluid and air escaping from the valve to the water in the chamber.

HENRI ANDRÈ RICHARD.